United States Patent [19]

Wang et al.

[11] Patent Number: 5,767,384
[45] Date of Patent: Jun. 16, 1998

[54] SYSTEM FOR DEVELOPING LAMINAR FLOW

[75] Inventors: Tak Kui Wang, Havertown, Pa.; James W. Baker, Elkton, Md.; Stephen M. Craig, Wilmington, Del.

[73] Assignee: Hewlett-Packard Company, Palo Alto, Calif.

[21] Appl. No.: 521,780

[22] Filed: Aug. 30, 1995

[51] Int. Cl.$^6$ ............ G01N 7/00; G01N 19/10; G01N 33/497; G01N 29/00
[52] U.S. Cl. ............ 73/23.21; 73/23.42; 73/863.71; 137/8
[58] Field of Search ............ 73/23.21, 23.42, 73/861.71, 201.21, 863.71; 137/2, 8

[56] References Cited

U.S. PATENT DOCUMENTS

| | | |
|---|---|---|
| 3,530,568 | 9/1970 | Owczarski et al. ............ 29/428 |
| 4,119,276 | 10/1978 | Nelson ............ 239/590.3 |
| 4,774,833 | 10/1988 | Weibler et al. ............ 73/204.21 |
| 5,495,747 | 3/1996 | Herman et al. ............ 73/23.21 |
| 5,567,868 | 10/1996 | Craig et al. ............ 73/863.71 |
| 5,596,969 | 1/1997 | Lipinski ............ 73/204.21 |

*Primary Examiner*—George M. Dombroske
*Assistant Examiner*—Max H. Noori
*Attorney, Agent, or Firm*—Mark Z. Dudley

[57] ABSTRACT

A flow conditioning system includes a flow randomizing section for receiving an input fluid stream and for increasing the uniformity of the streamwise velocity components of the input fluid stream while randomizing the non-streamwise velocity components, so as to provide a randomized fluid stream; a flow expansion section for receiving the randomized fluid stream and damping the non-streamwise velocity components therein, so as to provide a damped fluid stream; and a flow straightening section for receiving the damped fluid stream and for dividing the damped fluid stream into multiple, parallel output substreams so as to provide a laminar flow profile in an output fluid stream.

7 Claims, 7 Drawing Sheets

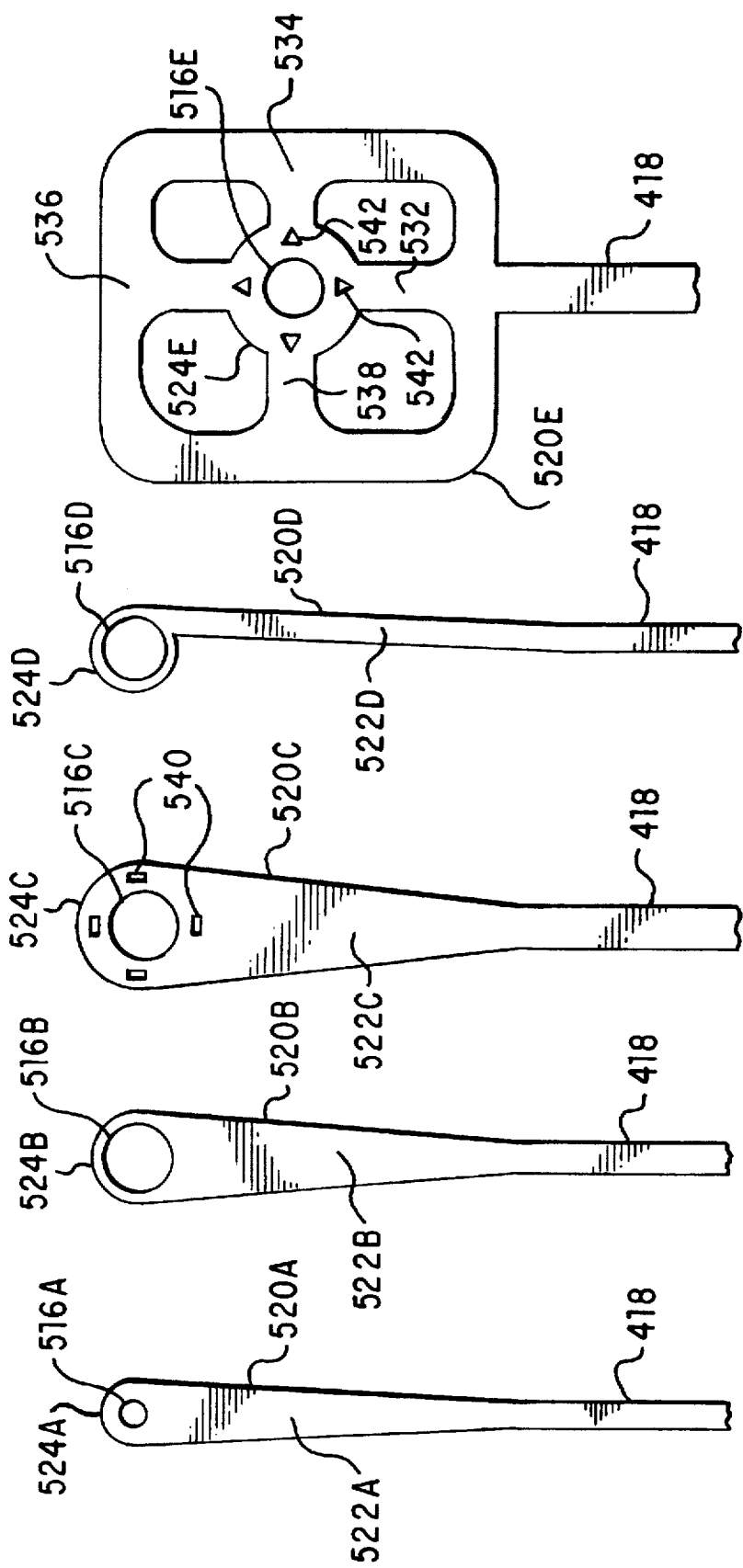

SYSTEM FOR DEVELOPING LAMINAR FLOW

FIELD OF THE INVENTION

The present invention relates to methods and apparatus for controlling a fluid stream in a pneumatic assembly, and more particularly with the provision of such a fluid stream in a state of steady or laminar flow.

BACKGROUND OF THE INVENTION

Instruments which rely upon accurate control of a fluid stream are commonly employed in a wide variety of applications, such as chromatography, chemical analysis, clinical assay, sample purification, and industrial processing. Such instruments typically function through devices that operate by initiating, maintaining, halting, or reversing a fluid stream through the instrument. Such instruments can employ one or more fluid streams in respective flow paths. The various flow paths are provided in a flow system that combines flow-through components, such as channels, sorbent columns, and connective tubing, with terminal components, such as needles, pumps, and drains. Selected flow paths are frequently employed to, for example, isolate a component from the flow system, attach a component into the flow system, or rearrange the order of certain components in the flow system. For many systems, an extensive and complex array of channels, tubing, fittings, and the like are employed to provide the many flow paths that are necessary for optimum operation.

Certain characteristics of a fluid stream may be expressed as a function of both time and space. Both density and velocity of a fluid stream may be dependent on the time or the location of plural fluid elements that comprise a fluid stream within a channel. Thus it is generally useful in fluid mechanics to choose a convenient origin of coordinates and to study only the velocity field of the fluid stream as a function of position or time. One scheme for describing the flow at every fixed point as a function of time is known as the eulerian formulation of motion. The eulerian velocity vector field can be defined in the following Cartesian form:

$$V(x,y,z,t)=iu(x,y,z,t)+jv(x,y,z,t)+kw(x,y,z,t)$$

wherein t is time, u, v, w are scalar variables and x, y, and z are coordinates in the Cartesian coordinate system.

In what is known as the steady flow of a fluid, the velocity and density of the fluid in a channel are observed to be independent of time, although each characteristic may vary from point to point from within the fluid stream. In an unsteady flow, the velocity and/or density are variable with time. An unsteady flow often develops in a fluid stream that encounters an abrupt transition, such as a step, corner, restriction, or other discontinuity in the channel that bears the fluid stream.

According to boundary-layer theory, the state of a fluid stream in a channel is most likely to be affected by at least two length dimensions. Viscous effects at the boundary walls of the channel are found to retard the fluid. A distance into the fluid stream, known as the boundary layer, represents the decelerating effects of wall friction. As the length of the flow path increases, the thickness of the boundary layer also increases, and with sufficient length of the flow path, the boundary layer will fill the channel completely. One application of boundary-layer theory is the determination of the streamwise component of a fluid stream 100 entering a channel 102, as illustrated in FIG. 1. The velocity profile in a well-rounded entrance 104 is nearly uniform. Then, at x=0, a shear layer 106 begins. Due to continuity requirements, a retardation of flow near the channel wall 112 causes the so-called potential core 108 to accelerate and the boundary-layer growth 110 is thinned. At some finite distance downstream, the shear layers meet, and the duct is filled with boundary layer. Shortly thereafter, at $x=x_L$, the flow is within approximately 1 percent of its final unaccelerated flow profile 114, e.g., the Poiseuille parabola. The flow thereafter is said to be fully developed and follows Poiseuille's law. The region $0<x<x_L$ is known as the entrance section and $x_L$ is known as the entrance length.

The velocity of a fluid stream is denoted by a figure of merit known as the Reynolds number, or Re. At a low velocity (i.e., a low Reynolds number), the fluid stream tends to continue its flow in an orderly, laminar, manner. When the velocity is increased, there is a transition point (the critical Reynolds number) at which a fluid stream will not maintain laminar flow and instead becomes unsteady. For example, critical Reynolds numbers of 25 are found in fluid flow that encounters a sharp discontinuity or transition.

It is desirable to maintain a steady or laminar flow of a fluid stream in certain flow systems. The provision of a steady fluid stream in a pneumatic assembly becomes exceedingly problematic when the assembly is operated at a flow rate that exceeds the critical Reynolds number, or when the flow system is reduced in size (which tends to lower the critical Reynolds number). In particular, there is an unfulfilled need to provide a pneumatic assembly that is compact, easily manufactured, inexpensive, and reliable, yet also is capable of operating at a critical Reynolds number that is higher than otherwise possible.

Accordingly, there is a need for a flow conditioning system for providing a steady fluid stream in one or more flow paths. Further, because such flow systems are sometimes provided in the form of a compact pneumatic assembly having short flow paths that are subject to abrupt transitions, wherein one or more of the fluid streams are likely to become unstable, there exists the practical problem of providing such a flow conditioning system for achieving steady or laminar flow in a compact pneumatic assembly.

Further, there may be a need to sense certain characteristics of the fluid stream at certain points in one or more of the flow paths in a pneumatic assembly. Examples of such sensed characteristics include the pressure, flow rate, and temperature of the fluid, or the presence or absence of a certain component of the fluid stream, such as an analyte or contaminant. Such needs are typically addressed by the integration of one or more sensors in a given flow path. However, most (if not all) of such sensors are designed to be exposed to steady or laminar flow. A sensor positioned in a fluid stream that is subject to unsteady flow is likely to provide false or inaccurate sense data. Some sensors, such as those having a nonlinear response, are accurate only when subjected to a laminar fluid stream. Accordingly, a need exists for integrating a flow conditioning system into a pneumatic assembly for providing steady or laminar flow to a sensor.

SUMMARY OF THE INVENTION

A flow conditioning system may be constructed in accordance with the present invention to address the foregoing problems and deficiencies in the prior art. A preferred embodiment of the flow conditioning system includes a flow randomizing section for receiving an input fluid stream and for increasing the uniformity of the streamwise velocity components of the input fluid stream while randomizing the non-streamwise velocity components, so as to provide a randomized fluid stream. A flow expansion section is provided for receiving the randomized fluid stream and damping the non-streamwise velocity components therein, so as to provide a damped fluid stream. A flow straightening section is provided for receiving the damped fluid stream and for dividing the damped fluid stream into multiple, parallel output substreams, each of which exhibit a reduced Reynolds number and thereby develop laminar flow, so as to provide a laminar flow profile in an output fluid stream. One notable achievement of such a flow conditioning system is that the entrance length of a fluid bearing channel may be shortened so as to more rapidly develop laminar flow from what would otherwise be an unsteady flow.

In a particularly preferred embodiment, a pneumatic assembly may be constructed to include a planar manifold having a port opening and a manifold channel therein for providing an input fluid stream, a flow randomizer integrated in a terminal portion of the manifold channel and located in fluid communication with the port opening so as to receive the input fluid stream and provide therefrom a randomized fluid stream, a fluid sensor having a first internal channel and an expansion volume provided in fluid communication with the first internal channel. Means are provided for surface mounting the fluid sensor to the planar manifold so as to provide fluid communication between the flow randomizer and the expansion volume for expansion of the randomized fluid stream to provide therefrom a damped fluid stream. A flow straightener is located within the first internal channel for receiving the damped fluid stream and for dividing the damped fluid stream into multiple, parallel output substreams, each of which exhibit a reduced Reynolds number and thereby develop laminar flow, so as to provide a laminar flow profile in an output fluid stream. A sensing device may be located within the first internal channel or a second internal channel communicating with the first internal channel for subjecting the output fluid stream to a predetermined measurement.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 5A–5E are plan views of flow randomizing sections preferred for use in the system of FIG. 4A.

DETAILED DESCRIPTION OF THE PREFERRED EMBODIMENTS

The present invention will find useful application in a variety of analytical systems that benefit from the use of one or more fluid streams. The apparatus and methods of the present invention may be employed in particular to develop steady or laminar flow in a fluid stream, and most particularly to the development of steady or laminar flow in a fluid stream in a short flow channel, as may be found in a compact or miniaturized pneumatic assembly.

Gases are the preferred fluids according to the practice of the present invention, and therefore the following description of the invention will include a description of the arrangement, construction, and operation of certain fluid bearing channels and fluid handling devices in a pneumatic assembly. The present invention is particularly directed to the use of a pneumatic assembly in a gas chromatographic analytical system (hereinafter, a chromatograph). However, for the purposes of the following description, the term "pneumatic" will also be considered to refer to all types of fluids. Further examples of analytical instruments that are particularly benefited by use of the present invention include instruments for performing supercritical fluid chromatography, liquid chromatography, and sample extraction.

According to a particular feature of the present invention, the pneumatic assembly 200 may be constructed and operated to effect a variety of fluid handling functions in a compact or portable (e.g., hand-held) analytical instrument. Such fluid handling functions heretofore have been difficult to achieve in conventional pneumatic assemblies. However, it should be understood that the description and teachings herein may be applied as well to the construction of a pneumatic assembly of any size, or for use with fluid handling functions that may associated with other instruments adapted for primary use in a laboratory, industrial plant, or manufacturing process.

Figure 1:
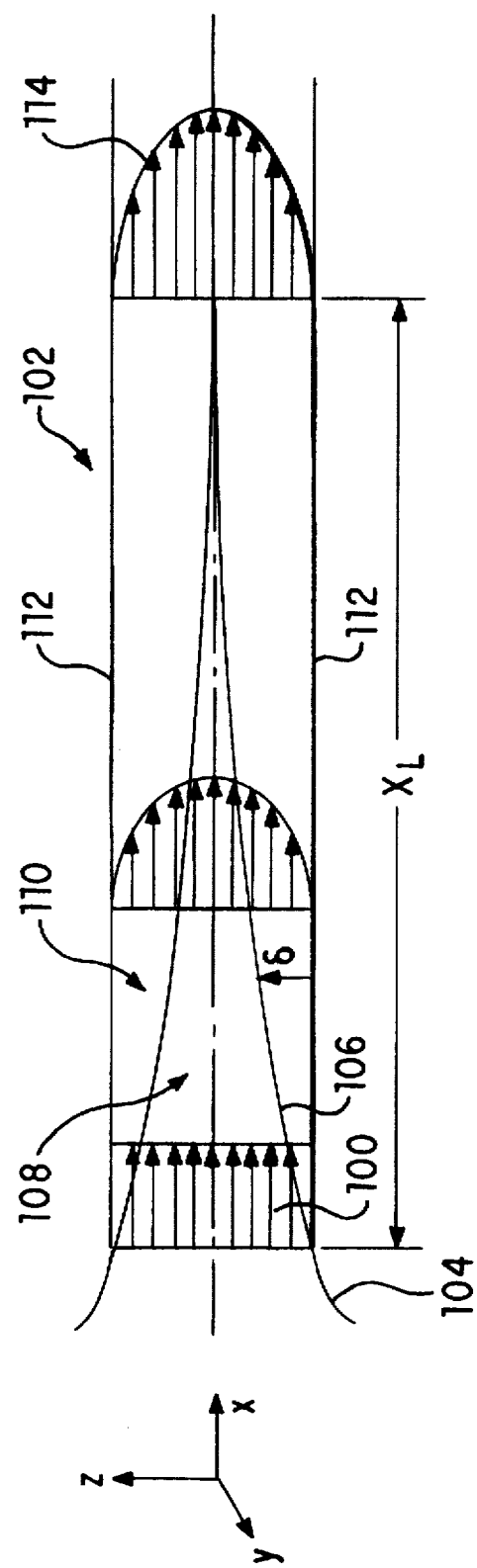
FIG. 1 is a schematic representation of velocity profiles in a fluid stream according to the prior art.
Figure 2:
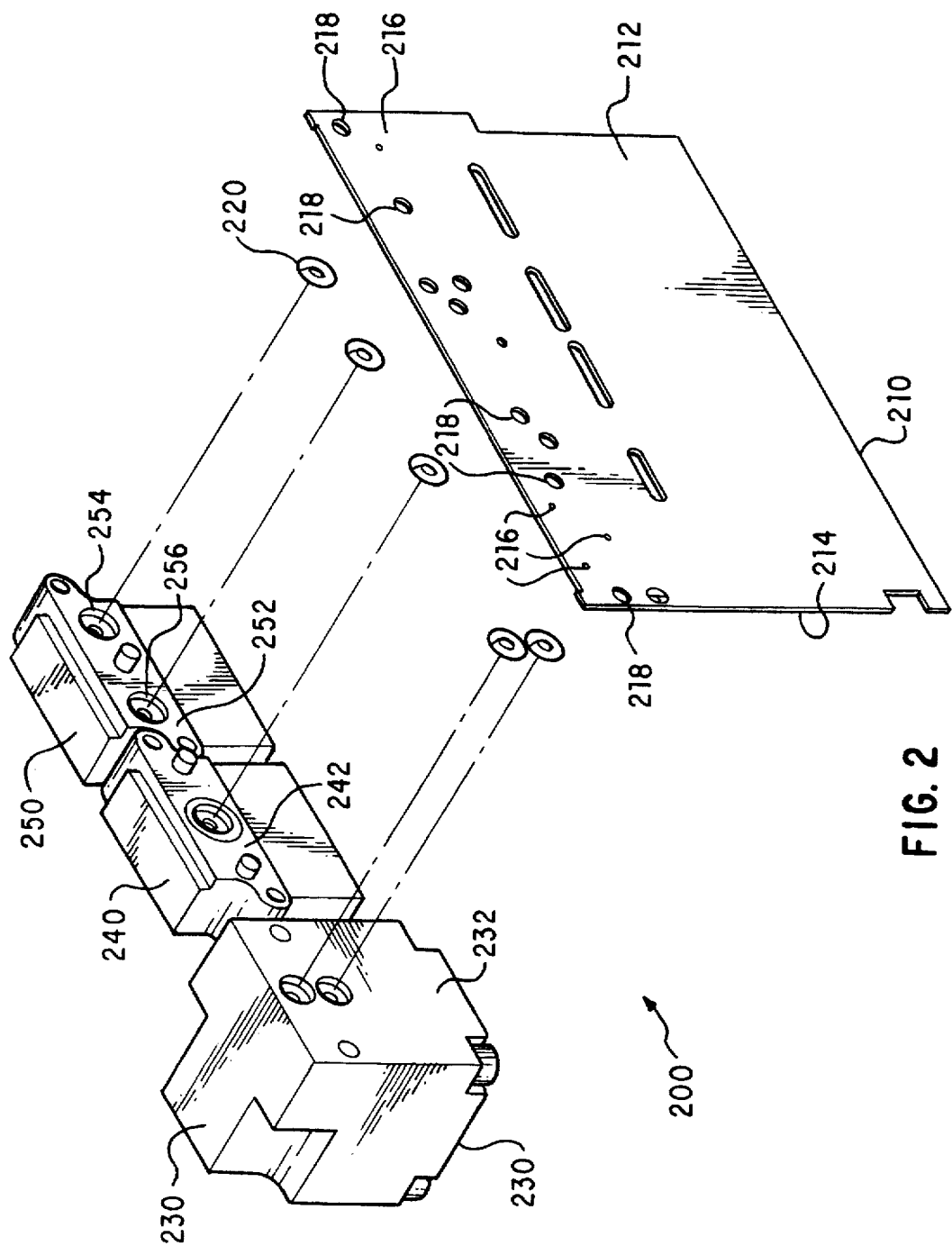
FIG. 2 is an exploded, perspective view of a novel pneumatic assembly constructed to include a plurality of fluid sensors and a planar manifold in accordance with the present invention.

A new and novel flow system preferred for use in an analytical instrument is shown in FIG. 2 and is generally designated as a pneumatic assembly 200. The preferred pneumatic assembly 200 is contemplated in particular for use in an instrument for performing a chromatographic separation of a sample compound. A plurality of flow paths are provided through the pneumatic assembly 200 by way of one or more planar manifolds 210. The preferred embodiment of the planar manifold 210 includes a front plate and a back plate each of which being sized and constructed to be superimposed and bonded together during the manufacturing process. Preferably, the front plate and back plate are machined from stainless steel and etched to provide an arrangement of internal channels and surface features, such as a plurality of ports as discussed below, before being bonded together. The preferred method of bonding is diffusion bonding, which generally is known in the art and is described in, for example, U.S. Pat. No. 3,530,568, the disclosure of which is included herein by reference. However, in other embodiments, other materials and bonding methods may be employed, and a number of intermediary plates (such as one, two, or more, not shown) are also contemplated being provided intermediate the front plate and back plate to form a multi-layer configuration.

The planar manifold 210 serves in part to control and redirect a plurality of gas flows, including carrier gas, and may include a plurality of detector gases of appropriate types, such as air, hydrogen, and make-up gas provided from respective sources. Suitable fluid handling devices, such as fittings, regulators, valves, sensors, and the like are integrated into the pneumatic assembly 200. These fluid handling devices may be passive (such as a termination fitting), or operated under the control of appropriate control systems to effect control or sensing of, e.g., fluid flow rate, fluid pressure, fluid flow direction, and continuity or discontinuity of fluid flow. Control signals and sensed information may be provided through appropriate signal-interface electronics (not shown) that are integrated in the valves, sensors, and other fluid handling devices that are attached to the planar manifold 210.

Appropriate fluid handling devices, such as supply fittings (not shown), are employed to transfer fluid streams to and from a plurality of internal, fluid-bearing manifold channels in the planar manifold 210. Such manifold channels are accessible at respective ports on the front and rear surfaces 212, 214 of the planar manifold 210. Examples of such ports 216 are shown on the front surface 212. Each port on the planar manifold 210 is sized and located to allow the use of seals 220 for face-sealing a particular fluid handling device to the planar manifold 210. Each fluid handling device may be clamped to the planar manifold 210 with the aid of suitable means known in the art, such as fasteners (not shown) that pass through appropriate through-holes 218 so as to be secured by suitable means.

In the illustrated pneumatic assembly 200, the preferred fluid handling devices include a flow controller 230, a first sensor 240, and a second sensor 250. In a particularly preferred embodiment, the first sensor 240 is constructed as a pressure sensor and the second sensor 250 is constructed as a flow sensor. The respective faces 232, 242, 252 are thus face-sealed to the planar manifold 210 to allow fluid streams to be passed through one or more ports to and from the fluid handling devices. Further details on the construction and operation of the planar manifold 210 may be found in co-pending, commonly-assigned U.S. patent application Ser. No. 08/376,614 entitled PLANAR MANIFOLD ASSEMBLY filed in the names of Stephen R. Craig, Paul B. Welsh, and Robert C. Henderson, the disclosure of which is incorporated herein by reference.

In the illustrated embodiment, a fluid stream is redirected from one of several manifold channels so as to pass through the second sensor 250 for the purpose of sensing one or more characteristics of the fluid stream. After the characteristic of the fluid stream has been measured by the appropriate sensing device(s) in the second sensor 250, the fluid stream is then returned to the planar manifold 210. The second sensor 250 is preferably constructed as a miniaturized, low-profile device using techniques of fabrication and assembly known the micromachining and integrated circuit arts. Accordingly, the flow path in the second sensor 250 will include one or more fluid bearing channels that may include abrupt discontinuities or transitions, such as a change in direction. The flow path experienced by an exemplary fluid stream in such conditions will now be described.

The fluid stream exits the planar manifold 210 at a terminus of a manifold channel in a direction perpendicular to the rear surface 214 of the planar manifold 210. Thus, the fluid stream encounters a first redirection at a 90 degree angle to the flow path within the planar manifold 210. The fluid stream then passes through the center of a seal 220 and enters the fluid sensor 250 through a similarly-sized input port 254 that is recessed to accommodate the seal 220. The fluid stream is carried within the fluid sensor 250 by a first internal channel. The fluid stream is redirected again at a 90 degree angle to follow a second internal channel that is generally parallel to the rear surface 214. Located within the first or second internal channel there is preferably a sensing device, such as a flow rate sensing chip that is constructed preferably in the form of an integrated circuit and attached to a surface of the first or second internal channel. While the sensing device is subjected to the presence of the fluid stream, sense data is provided to appropriate electronic devices for subsequent analysis. The fluid stream is thereafter redirected, at an angle of 90 degrees with respect to the second internal channel, to follow a third internal channel so as to exit the fluid sensor 250 at an output port 256 and re-enter the planar manifold 210.

Accordingly, while following the aforementioned flow path, the fluid stream may be subject to one or more flow path transitions or discontinuities that can be expected to create unsteady flow, or (at a minimum) affect the development of laminar flow at a necessary point within the flow path. Heretofore, a fluid stream present in the aforementioned conditions would exhibit unsteady or turbulent flow at a relatively low critical Reynolds number. Furthermore, if unsteady flow were to arise as a result of, for example, the redirection of the fluid stream from the planar manifold 210 to the first internal channel, or the redirection of the fluid stream from the first channel to the second channel, then a relatively long channel length in the first or second internal channel would be required to regain steady or laminar flow in the fluid stream. However, long channel lengths are impractical because of a desire to miniaturize the planar manifold 210 and its fluid handling devices so as to provide a pneumatic assembly 200 in a compact unit.

Figure 3:
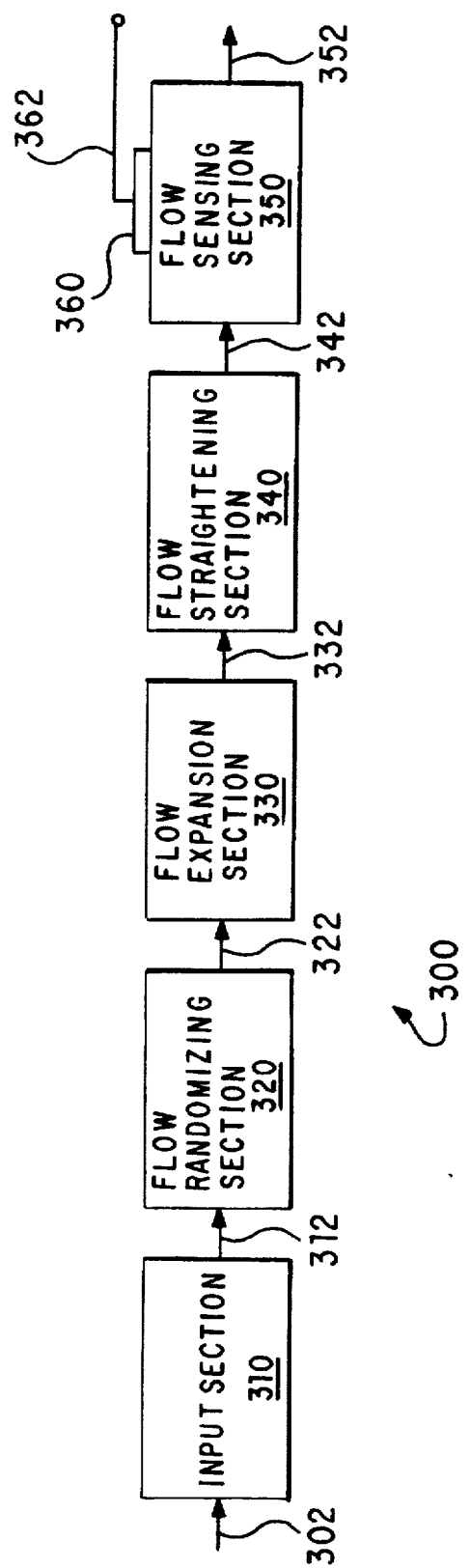
FIG. 3 is a block diagram of a flow conditioning system for developing laminar flow according to the present invention.

In accordance with the present invention, FIG. 3 illustrates a preferred embodiment of a novel flow conditioning system 300 that is integrated in the pneumatic assembly 200 of FIG. 2 to resolve the aforementioned problems while providing a flow path suitable for subjecting a fluid stream to measurement by one or more sensors. The fluid stream of interest is passed through (in sequence): an input section 310, a flow randomizing section 320, a flow expansion section 330, and a flow straightening section 340 before entering a flow sensing section 350. According to a particular feature of the present invention, the fluid stream of interest will thereby be provided as a steady or laminar flow to the flow sensing section 350 at a critical Reynolds number that is higher than would otherwise be possible. Alternatively, the pneumatic assembly 200 may be operated at a relatively low critical Reynolds number, yet be constructed in a very compact assembly that includes fluid bearing channels that are shorter than is otherwise possible.

The input section 310 is constructed as a channel for receiving the fluid stream 302 of interest and directing the fluid stream as an input fluid stream 312 into the flow randomizing section 320. The flow randomizing section 320 is constructed to effect greater uniformity in the streamwise velocity component in the randomized fluid stream 322 while randomizing the remaining non-streamwise velocity components. The contemplated randomization of the non-streamwise velocity components has been found to reduce most if not all of existing turbulence in the input fluid stream 312. The flow expansion section 330 is constructed to receive and expand the randomized fluid stream 322 so as to damp the non-streamwise velocity components, thus providing a damped fluid stream 332 that, in some embodiments, may be characterized as having a "plug" flow profile, that is, a fluid stream having maximum amount of streamwise flow velocity components and an insignificant amount of non-streamwise flow velocity components. An ancillary effect of the contemplated damping is the reduction of pressure variations exhibited by the randomized fluid stream 322. The flow straightening section 340 is constructed to divide the damped fluid stream 332 into multiple, parallel output substreams, each of which exhibit a reduced Reynolds number and thereby develop laminar flow before exiting the flow straightening section 340. The multiple, parallel output substreams thereafter merge into an overall laminar flow profile in an output fluid stream 342. The flow sensing section 350 is constructed to receive the output fluid stream 342 from the flow straightening section 340 and direct the output fluid stream 342 into proximity with an measuring device 360 such as a miniaturized sensor. A preferred embodiment of the measuring device is an integrated circuit constructed so as to be integrated within, or mounted upon, an interior wall of a fluid bearing channel within the flow sensing section 350. The resulting measurement may be represented by sense data directed on a data line 362 to suitable electronic apparatus (not shown). A measured fluid stream 352 then exits the flow sensing section 350 and may be used for other purposes.

Figure 4A:
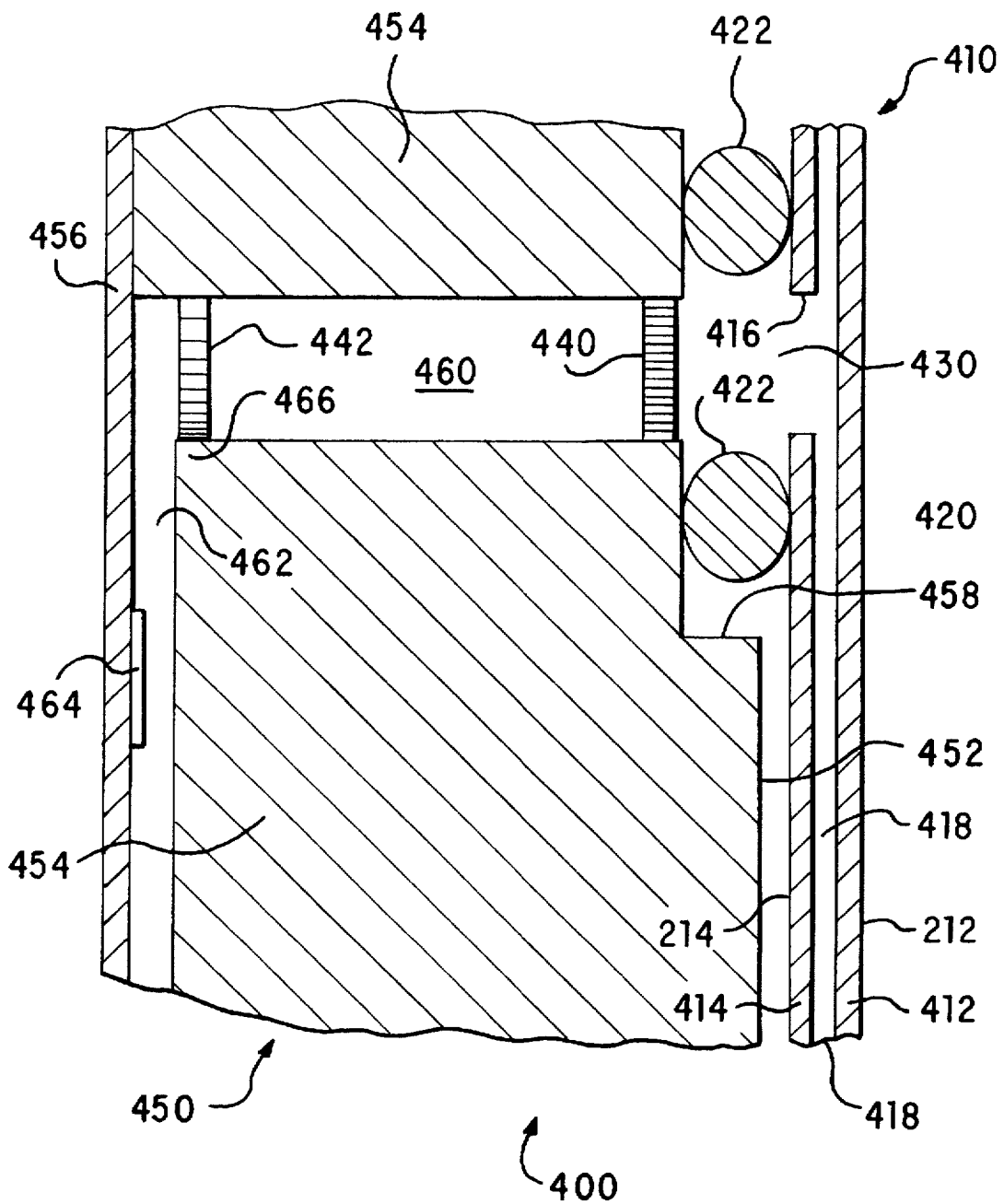
FIG. 4A is a side sectional view of a preferred embodiment of the system of FIG. 2.
Figure 4C:
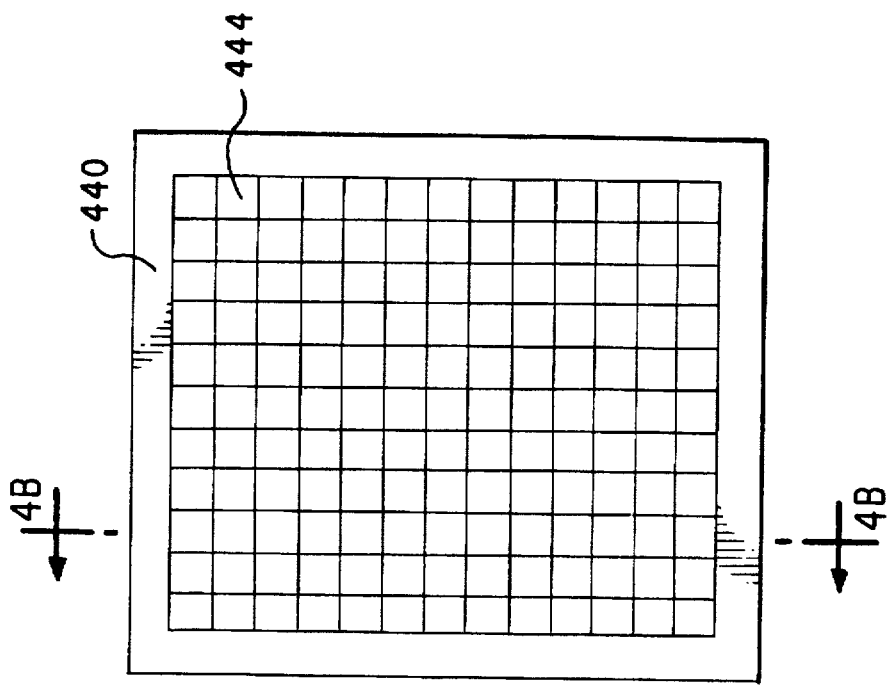
FIGS. 4B and 4C are side sectional and plan views, respectively, of a first flow straightener preferred for use in the system of FIG. 4A.
Figure 4B:
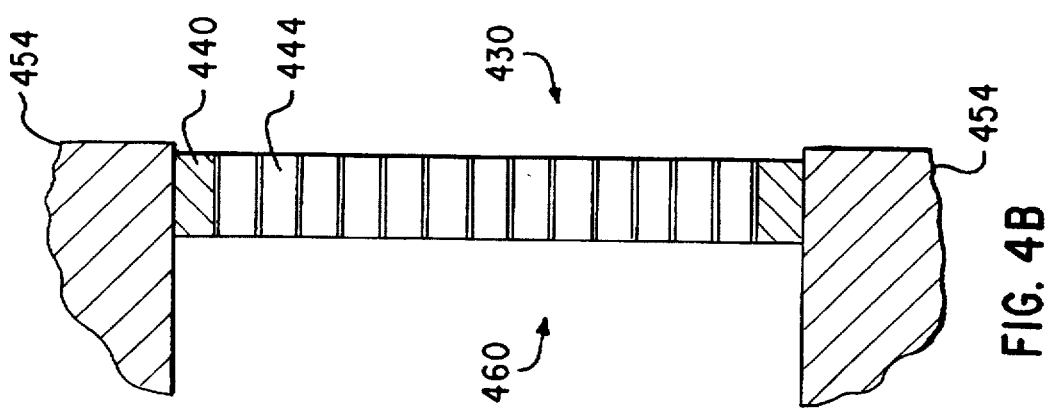

As illustrated in FIG. 4A, a preferred embodiment 400 of a portion of the pneumatic assembly 200 may be seen in cross-sectional detail to include a planar manifold 410 attached to a fluid sensor body 450. The planar manifold 410 and fluid sensor body 450 are constructed using a plurality of plates that have been etched, drilled, and bonded so as to provide a compact unit having a low-profile, planar aspect ratio. The planar manifold 410 includes a front plate 412, a rear plate 414, a port 416, and a manifold channel 418. The fluid sensor body 450 is constructed from a first plate 454 having a front surface 452, a second plate 456, a first internal channel 460 communicating with a second internal channel 462, a microminiature sensing device 464 located within either the first internal channel 460 (or, as illustrated, in the second internal channel 462) and a recess 458 for receiving an oring 422.

A fluid stream present in the manifold channel 418 may be directed first to a flow randomizer 420 integrated in the planar manifold 410 within the terminus of the manifold channel (i.e., adjacent the port 416). An o-ring 422 provides a gas-tight seal at the face 452 of the fluid sensor body 450 such that an expansion volume 430, located between the port 416 and the first internal channel 460, provides for expansion of the fluid stream as it is output from the flow randomizer 420. A first flow straightener 440 is located within the opening of the first internal channel 460. Alternatively, a second flow straightener 442 may instead be located at the transition of the first internal channel 460 to the second internal channel 462. For illustrative purposes, both the first flow straightener 440 and the second flow straightener 462 are shown in FIG. 4A. However, in most applications, only one of such devices will be required. For example, certain applications may require only the second flow straightener 442 and the first flow straightener 440 is omitted, or vice-versa. In an application wherein the first flow straightener 440 is omitted, a portion of the first internal channel 460 functions as an extension of the expansion volume 430. As will be described in detail below, preferred embodiments of the first and second flow straighteners 440, 442 are each constructed in the form of a thin porous element having front and rear parallel major surfaces and in a preferred embodiment the porosity is provided by an array of minute, closely-packed, parallel, tubes. The array of tubes is arranged to permit fluid communication of the fluid stream therethrough as a plurality of divided substreams.

As shown in FIGS. 4B–4E, each of the first and second flow straighteners 440, 442 preferably comprise a respective array of closely-packed, parallel tubes 444, 446. The first flow straightener 440 is located such that its major surfaces are transverse to the direction of the flow path, and its tubes 444 are thereby aligned with the direction of the flow path from the expansion volume 430 to the first internal channel 460. The second flow straightener 442 is located such that its tubes 446 are also aligned with the direction of the flow path in the first internal channel 460 before the flow path must turn to enter the second internal channel 462.

According to a particular feature of the present invention, one may vary either the fluid capacity and/or arrangement of the tubes 446 in the second flow straightener 442 according to a desired flow profile of the fluid stream as it exits the flow straightening section 340. For example, for fully developed laminar flow in a fluid bearing channel having a circular cross-section, the desired flow profile would be parabolic with higher flow velocity in the center of the fluid stream and near zero velocity at the channel wall. By varying the width or the distribution (i.e., density) of the tubes 446 with respect to the center of the fluid stream, the flow profile can be compensated to achieve the desired, fully-developed laminar flow in the second internal channel 462.

Figure 4E:
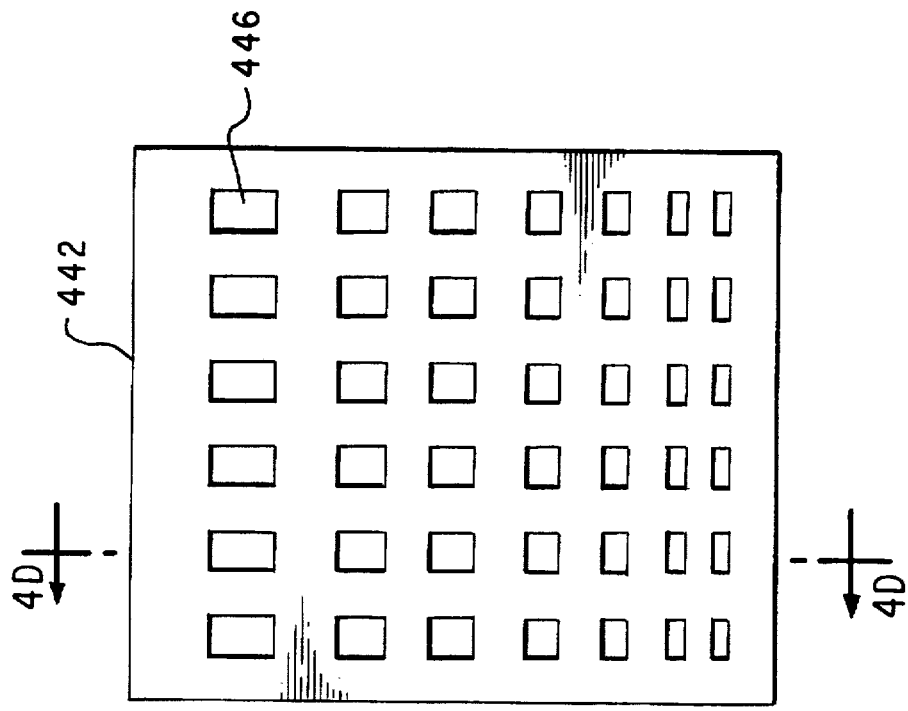
FIGS. 4D and 4E are side sectional and plan views, respectively, of a second flow straightener preferred for use in the system of FIG. 4A.
Figure 4D:
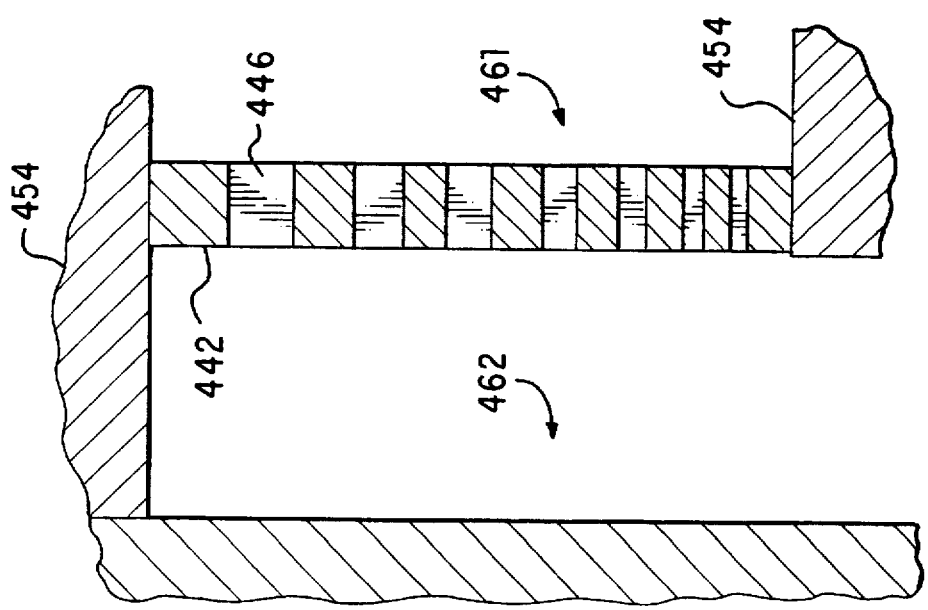

As illustrated in FIGS. 4D–4E, a parabolic flow profile would not be realized in the second internal channel 462 due to a separation of the fluid stream that can be expected to occur at an abrupt redirection of the flow path (such as at the corner 466 illustrated between the first internal channel 460 and second internal channel 462 in FIG. 4D). Therefore, the array of tubes 446 in the second flow straightener 442 may: a) be uniformly distributed but have increasing width (i.e., increased capacity) as the location of the tubes progresses from the corner 466 to the opposing wall of the first internal channel 460, or b) have uniform capacity but be more densely arranged as the distribution of the tubes progresses from the corner 466 to the opposing wall of the first internal channel 460. In either embodiment, the desired parabolic flow profile can be realized because of the decreased flow velocities of the fluid stream components proximate to the corner 466, thus preventing the onset of fluid separation as the fluid stream exits the second flow straightener 442 and is forced to change direction as it enters the second internal channel 462.

As shown in FIGS. 5A–5E, the flow randomizer 420 may be constructed according to one of variety of preferred embodiments, respectively designated as randomizers 520A–520E. The randomizers 520A, 520B, 520C each comprise a channel etched in at least one of the front and rear plates 414, 412 in the form of a gradually-expanding flared extension 522A, 522B, or 522C to the manifold channel 418. The rounded terminal portions 524A, 524B, or 524C are each concentric with a respective port opening 516A, 516B, or 516C. Randomizer 520D is provided in the form of an extension 522D that tangentially approaches a terminal portion 524D so as to induce a vortex flow path about the port opening 516D. Randomizer 520E is provided in the form of an etched plurality of secondary channels 532, 534, 536, 538 that receive respective subdivisions of the fluid stream carried in the manifold channel 418. The secondary channels 532, 534, 536, 538 are spaced evenly about a terminal portion 524E so as to swirl the subdivisions of the fluid stream into the port opening 516E.

It is contemplated that the randomizers 520C and 520E may require pillars 540, 542 that extend perpendicularly from the floor of the rear plate 414 so as to contact the front plate 412 when the front and rear plates 414, 412 are bonded together. Such pillars 540, 542 are provided to prevent distortion or collapse of the rear plate 414 onto the front plate 412 when the fluid sensor body 454, o-ring 422, and planar manifold 410 are clamped together. The presence of the pillars 540, 542 also enhance the randomization of the fluid stream as it approaches the port openings 516A–516E.

An experimental embodiment of the pneumatic assembly 400 was demonstrated in a working model that achieved steady flow in the second internal channel 462 at increased flow rates on the order of 300 ml/min., which represent an approximately three-fold increase in the steady flow rate achieved in a pneumatic assembly constructed according to the prior art. A suitable flow straightener 440 was provided as an uncoated microchannel plate, commercially available from Galileo Electro-Optics, having thickness of 0.02 inches with spaced parallel channels each having a diameter of approximately 0.005 inch with a 0.01 inch spacing.

The preferred embodiments of a pneumatic assembly 200, 400 may therefore be constructed according to the present invention to offer several advantages. A pneumatic assembly may be provided in a compact, integrated unit that allows for simplified mounting of a variety of fluid handling devices (such as sensors as described herein, but also fittings, valves, and the like). In particular, the pneumatic assembly may be constructed according to the present invention to use miniature or microminiature surface-mounted fluid handling devices so as to reduce the complexity of manufacturing, assembly, operation, repair, or modification of the instrument in which the pneumatic assembly may be operated. The number and complexity of fluid connections, which would otherwise undesirably increase the size of the instrument, are decreased and the reliability of the connections is also improved.

A further advantage of the present invention is that a plurality of flow paths and multiple fluid handling functional devices may be integrated in a smaller assembly than is possible in prior art systems. This feature facilitates the use of, for example, miniature or microminiature flow sensors which incorporate very short fluid bearing channels. Furthermore, many of the fluid streams in the pneumatic assembly 200 are thereby made susceptible to measurement than would heretofore be practical.

While the invention has been described and illustrated with reference to specific embodiments, those skilled in the art will recognize that modification and variations may be made without departing from the principles of the invention as described herein above and set forth in the following claims.

What is claimed is:

1. A flow conditioning system, comprising:

a flow randomizing section for receiving an input fluid stream and for increasing the uniformity of the streamwise velocity components of the input fluid stream while randomizing the non-streamwise velocity components, so as to provide a randomized fluid stream;

a flow expansion section for receiving the randomized fluid stream and damping the non-streamwise velocity components therein, so as to provide a damped fluid stream; and a flow straightening section for receiving the damped fluid stream and for dividing the damped fluid stream into multiple, parallel output substreams, so as to provide a laminar flow profile in an output fluid stream.

2. The flow conditioning system of claim 1, further comprising a flow sensing section for receiving the output fluid stream and for subjecting the output fluid stream to a predetermined measurement.

3. The flow conditioning system of claim 2, wherein the flow sensing section further comprises a fluid bearing channel for receiving the output fluid stream and a sensing device mounted within the fluid bearing channel.

4. The flow conditioning system of claim 1, wherein the flow randomizing section further comprises a flared fluid bearing channel communicating with a port for provision therefrom of said randomized fluid flow, the flared fluid bearing channel having a rounded terminal portion and the rounded terminal portion being concentric with the port.

5. The flow conditioning system of claim 1, wherein the flow straightening section further comprises a flow straightener having front and rear major surfaces and an array therebetween of adjacent, parallel tubes, and wherein the fluid capacity of the tubes is varied according the distribution of the tubes in the array.

6. The flow conditioning system of claim 1, wherein the flow straightening section further comprises a flow straightener having front and rear major surfaces and an array therebetween of adjacent, parallel tubes, and wherein the distribution of the tubes in the array is varied according to a desired flow profile of the output fluid.

7. A method for conditioning fluid flow in a fluid stream, comprising the steps of:

receiving the fluid stream as an input fluid stream and increasing the uniformity of the streamwise velocity components of the input fluid stream while randomizing the non-streamwise velocity components, so as to provide a randomized fluid stream;

receiving the randomized fluid stream and damping the non-streamwise velocity components therein, so as to provide a damped fluid stream; and receiving the damped fluid stream and dividing the damped fluid stream into multiple, parallel output substreams, each of which exhibit a reduced Reynolds number and thereby develop laminar flow, so as to provide a laminar flow profile in an output fluid stream.

* * * * *